United States Patent
Hassani et al.

(10) Patent No.: US 11,569,983 B2
(45) Date of Patent: Jan. 31, 2023

(54) VEHICLE DIGITAL KEY CLOUD STORAGE

(71) Applicant: Ford Global Technologies, LLC, Dearborn, MI (US)

(72) Inventors: Ali Hassani, Ann Arbor, MI (US); Hamid M. Golgiri, Livonia, MI (US); Vivekanandh Elangovan, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 677 days.

(21) Appl. No.: 16/566,641

(22) Filed: Sep. 10, 2019

(65) Prior Publication Data

US 2021/0075594 A1  Mar. 11, 2021

(51) Int. Cl.
*H04L 9/08* (2006.01)
*G06Q 10/02* (2012.01)
*H04W 4/021* (2018.01)
*H04W 8/00* (2009.01)

(52) U.S. Cl.
CPC ............... *H04L 9/08* (2013.01); *G06Q 10/02* (2013.01); *H04W 4/021* (2013.01); *H04W 8/005* (2013.01)

(58) Field of Classification Search
CPC .......... H04L 9/08; H04W 4/021; H04W 8/005
See application file for complete search history.

(56) References Cited

U.S. PATENT DOCUMENTS

| | | | |
|---|---|---|---|
| 9,663,067 B2 | 5/2017 | Penilla et al. | |
| 2016/0097648 A1* | 4/2016 | Hannah | G08G 1/0116 701/118 |
| 2016/0098871 A1* | 4/2016 | Oz | H04W 4/40 340/5.61 |
| 2017/0330402 A1 | 11/2017 | Menard et al. | |
| 2018/0091930 A1* | 3/2018 | Jefferies | G07C 9/00571 |
| 2019/0392107 A1* | 12/2019 | Ricci | G06F 21/31 |
| 2020/0393254 A1* | 12/2020 | Gardner | G01C 21/3438 |

* cited by examiner

*Primary Examiner* — Kristie D Shingles
(74) *Attorney, Agent, or Firm* — Gregory P. Brown; Brooks Kushman P.C.

(57) ABSTRACT

A vehicle includes a wireless transceiver; and one or more controllers, programmed to receive, via the wireless transceiver, a hailing instruction that identifies a user to ride in the vehicle, the hailing instruction including an identifier of a mobile device of the user, responsive to receiving a key from the mobile device via a wireless connection between the mobile device and the wireless transceiver, associate the key with the identifier, and send the key and the identifier as an associated pair to a server via the wireless transceiver.

15 Claims, 4 Drawing Sheets

VEHICLE DIGITAL KEY CLOUD STORAGE

TECHNICAL FIELD

The present disclosure generally relates to vehicle digital key authentication. More specifically, the present disclosure relates to a process and system for authenticating a user to a vehicle via a mobile device and a cloud server.

BACKGROUND

Digital keys may be used to access and operate a vehicle. A user may access a vehicle via a mobile device such as a phone without using a physical key. A digital authentication process may take some time. Depending on the specific configuration, the process may take a long time to complete during which the user cannot enter or use the vehicle, causing a so-called "brick wall effect." The "brick wall effect" may be particularly significant for authentication between a mobile device and a vehicle for a first-time connection, as the time may range from a few seconds to tens of seconds. The time delay may cause inconvenience especially for ride hailing or vehicle rental services as the users change vehicles all the time and each time is a first-time connection.

SUMMARY

In one or more illustrative embodiments of the present disclosure, a vehicle includes a wireless transceiver; and one or more controllers, programmed to receive, via the wireless transceiver, a hailing instruction that identifies a user to ride in the vehicle, the hailing instruction including an identifier of a mobile device of the user, responsive to receiving a key from the mobile device via a wireless connection between the mobile device and the wireless transceiver, associate the key with the identifier, and send the key and the identifier as an associated pair to a server via the wireless transceiver.

In one or more illustrative embodiments of the present disclosure, a server includes one or more controllers, programmed to responsive to receiving, from a mobile device, a hailing request including an identifier, a pickup time, and a pickup location, select a vehicle to respond to the hailing request, send, to the mobile device, a hailing confirmation identifying the vehicle as being selected, send, to the vehicle as selected, a hailing instruction including the identifier, the pickup time, and the pickup location, and responsive to receiving, from the vehicle, a key provided by the mobile device and associated with the identifier, store the key as associated with the identifier in a lookup database.

In one or more illustrative embodiments of the present disclosure, a method for a vehicle includes responsive to receiving, from a server via a wireless network through a telematics control unit (TCU), a hailing instruction including an identifier associated with a mobile device, a hardware identification address, and pickup location, autonomously operate the vehicle to the pickup location; responsive to identifying the mobile device using the hardware identification address, connect to the mobile device via a wireless connection through a wireless transceiver; responsive to receiving a key from the mobile device via a wireless connection, associate the key with the identifier, sending the key and identifier as associated to the server via the TCU.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
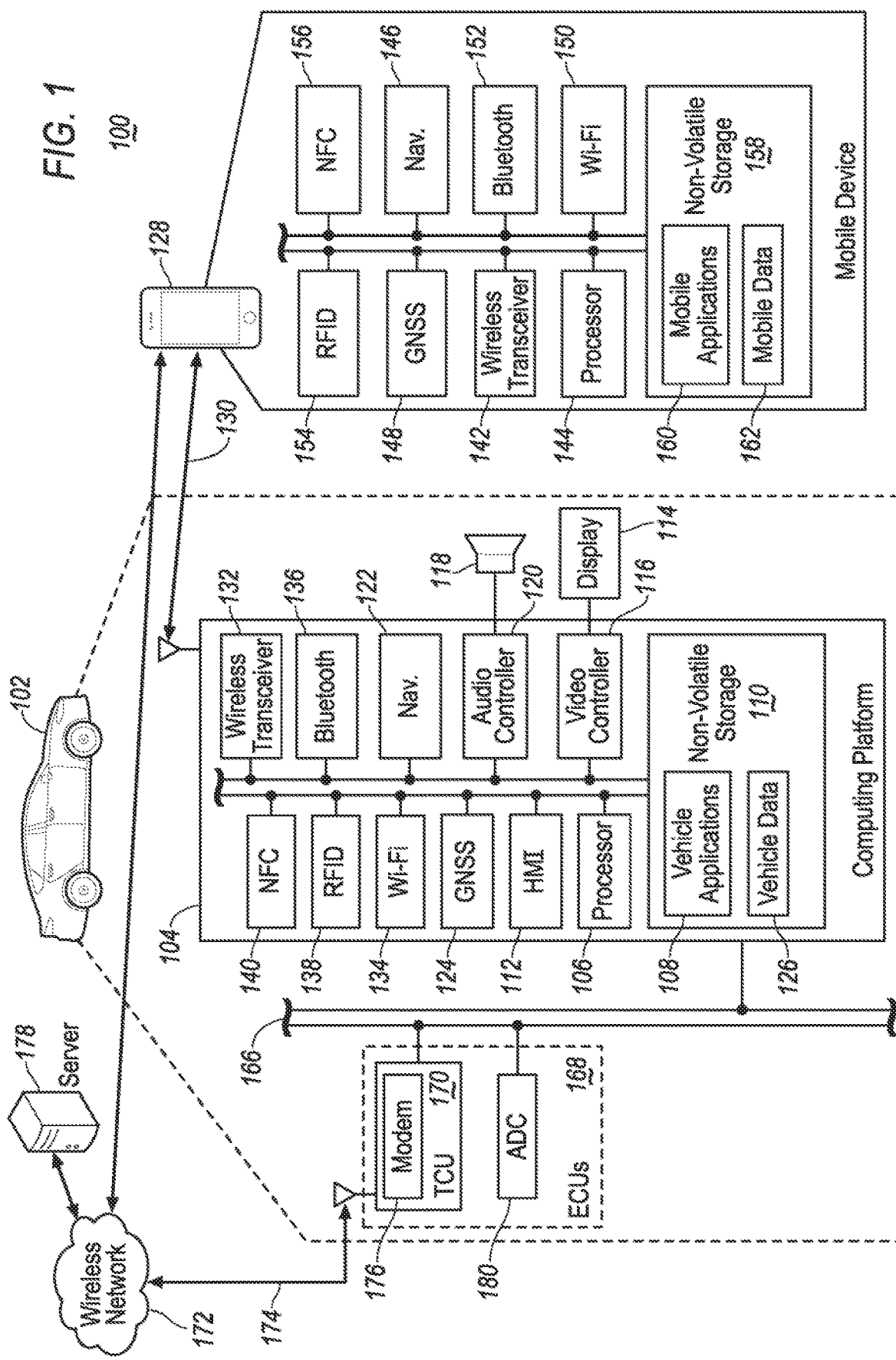
FIG. 1 illustrates an example block topology of a vehicle system of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for digital key authentication. More specifically, the present disclosure proposes a vehicle system for storing digital keys in a cloud server and loading the keys from the cloud server.

Digital keys from a mobile device may be used to access a vehicle without having the user carry a physical key. The mobile device may be connected to the vehicle via a wireless connection such as a BLUETOOTH Low Energy (BLE), ultra-wide band (UWB) or a Wi-Fi connection. However, the connecting and authenticating process may take a long time, especially for the first-time connection, creating the "brick wall effect" (meaning the user feels like the process reached a brick wall end when they attempt access). During the connecting and authenticating process, the user may not be able to open the door and enter the vehicle, which may be inconvenient. The long processing time may be due to the standard BLE, UWB or Wi-Fi connection process to accommodate a mobile device that obfuscates advertisement packets when the device is locked and the app of the mobile devices is in the background. To address this, a double connection process may be used. First, the mobile device may act as the master. Then, the vehicle may store the phone encryption keys and disconnect. Next, the vehicle may act as the master to connect to the mobile device even with obfuscated advertisement packets from the mobile device, since the vehicle now has the encryption keys associated with the mobile device. The time increase due to the double connection process may affect user experience.

The present disclosure utilizes a cloud server to store encryption keys to reduce the connection and authentication time. The first time the mobile device is used to hail a ride from the vehicle, the standard double connection process may occur. Additionally, the vehicle may associate a unique identifier, such as a user identification (ID), with the encryption keys. The vehicle may then send that identifier to the cloud server, which may store the encryption keys and identifier in a lookup table. When the user hails a ride from the same mobile device, a vehicle responding to the hailing request (could be the same or a different vehicle) may send a request to the cloud server with an identifier of the mobile device. The cloud server may verify for the encryption keys corresponding to that identifier and send the key to the vehicle. After receiving the encryption key, the vehicle may skip to scanning for advertisements from the mobile device by checking for the appropriate identifications such as the media access control (MAC) address. In an alternative example, a shared key may be associated with a user account in addition to the mobile device. For instance, for service applications, vehicle technicians may share the same encryption key to simplify key delivery (i.e. a shared key type of account). In this scenario the hailing request may need to look up if it is a shared key type account and fetch the associated key in the database. There may also be a verification check to make sure it matches; if no match is found, the database may be updated with the new encryption key.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or more electric motors, such as a series hybrid electric vehicle (SHEV), a Plug-In hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, digital key processing, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output and input to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smartfobs, laptop computers, portable music players, or other devices capable of communication with the computing platform 104. A wireless transceiver 132 may be in communication with a Wi-Fi controller 134, a BLUETOOTH controller 136, a radio-frequency identification (RFID) controller 138, a near-field communication (NFC) controller 140, and other controllers such as a Zigbee transceiver, an IrDA transceiver, an UWB controller (not shown) and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a BLUETOOTH controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Further, the in-vehicle network 166, or portions of the in-vehicle network 166, may also be a wireless network accomplished via BLE, Wi-Fi, UWB, or the like.

The computing platform 104 may be configured to communicate with various ECUs 168 of the vehicle 102 configured to perform various options. For instance, the computing platform may be configured to communicate with a TCU 170 configured to control telecommunication between vehicle 102 and a wireless network 172 through a wireless connection 174 using a modem 176. The wireless connection 174 may be in the form of various communication network e.g. a cellular network. Through the wireless network 172, the vehicle may access one or more servers 178 to access various content for various purposes. It is noted that the terms wireless network and server are used as general terms in the present disclosure and may include any computing network involving carriers, router, computers, controllers or the like configured to store data and perform data processing functions and facilitate communication between various entities. The ECUs 168 may further include an autonomous driving controller (ADC) 180 configured to provide autonomous driving features to the vehicle 102.

Figure 2:
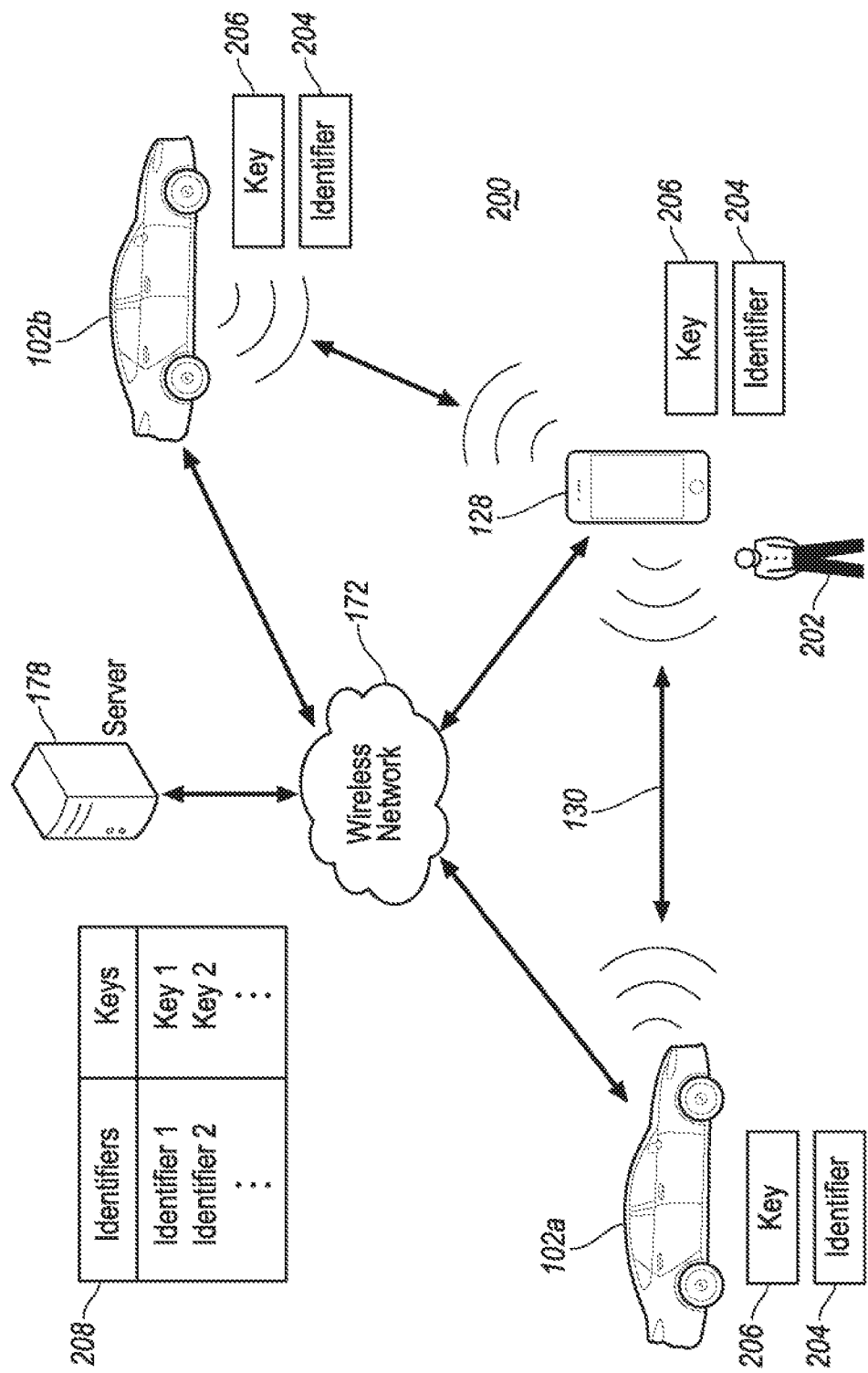
FIG. 2 illustrates an example schematic diagram of the vehicle system of one embodiment of the present disclosure.

Referring to FIG. 2, a schematic diagram 200 of one embodiment of the present disclosure is illustrated. With continuing reference to FIG. 1, in the present example, vehicles 102a, 102b may be associated with ride hailing services and provided with autonomous driving features. A user 202 may hail a ride via a mobile device 128 using a hailing application as one of mobile applications 160. A hailing request may be generated and sent to the server 178 via the wireless network 172. The hailing request may include various information such as pickup location and pickup time, as well as a user identifier 204 configured to identify the user 202 and/or the mobile device 128. The identifier may include a unique user identification associated with the user 202 and/or the mobile device 128 for instance. In response, the server 178 may process the hailing request and assign the vehicle 102a to the user 202 based on the request conditions. The server 178 may send instructions along with the identifier 204 to the vehicle 102a via the wireless network 172. Assuming this is the first time the user 202 uses the mobile device 128 for hailing services, neither the vehicle 102a or the server 178 has already obtained an encryption key allowing the user 202 to access the vehicle 102a (or any hailing service vehicles). As the user 202 carrying the mobile device 128 approaches the vehicle 102a, a double connection process may be used for the first-time connection. An encryption key 206 may be generated by the mobile device 128 and sent to the vehicle 102a as a wireless connection 130 (e.g. a BLUETOOTH Low Energy (BLE) connection) between the vehicle 102a and the mobile device 128 is established. Responsive to receiving the encryption key 206 from the mobile device 128 via the wireless connection 130, the vehicle 102a associates the identifier 204 previously received with the key 206. Next, the vehicle 102a may send the identifier 204 as well as the key 206 to the server 178 for storage. The server 178 may be provided with storage capabilities and store the identifier and key association in a lookup table database 208. From then on, the server 178 may be configured to provide correct keys 206 to vehicles 102 via the wireless network 172 responsive to receiving a corresponding identifier 204 associated with the user 202. The reasons for storing the keys in the server 178 may be useful is that future rides requested from the same mobile device 128 may be assigned with a different vehicle (e.g. the second vehicle 102b). The user 202 may use the same key 206 to access and operate the different vehicle 102b.

In the present example, the next time when the user 202 hails a ride from the mobile device 128, the server 178 may assign the same vehicle 102a or a different vehicle 102b to the user 202. Assuming the different vehicle 102b is assigned and receives the identifier 204 associated with the mobile device 128, the second vehicle 102b may send a request for encryption key to the server 178 with the identifier 204. The server 178 may check for the encryption key 206 corresponding to the identifier 204 received and send the key 206 to the vehicle 102b. Responsive to receiving the key 204 from the server 178, the vehicle 102b may start to scan for advertisements from the mobile device 128. The process occurs before the mobile device 128 and the vehicle 102b enters the communication range. Therefore, from the user's perspective, no additional time is added.

In some embodiments, a successful wireless connection 130 between the vehicle 102 and the mobile device 128 relies on the mobile device 128 starting to scan or advertise in a window of expected vehicle pickup time. The server 178 may be further configured to send a message to the mobile device 128 at a predefined time (e.g. fifteen minutes) before the schedule ride, instructing the hailing application 160 to begin scanning or advertising. Additionally, or alternatively, the hailing application 160 may be configured to automatically begin to scan and advertise prior to the scheduled ride. In some other embodiments, a successful wireless connection 130 relies on the mobile device 128 having the hailing application 160 running. The server 178 may send a text message or initiate an automated phone call or text to the user 202 to ask to open the application 160. Alternatively, the vehicle 102 may start sending beacons such as iBeacons or Eddystone beacons to the mobile device 128 instructing to launch the application 160. Alternatively, the server 178 may be configured to send a message to the mobile device 128 instructing it to start scanning and/or to launch the application 160 responsive to detecting the vehicle 102 and/or the mobile device 128 has entered a predefined geofence, such as the pickup location area.

Figure 3:
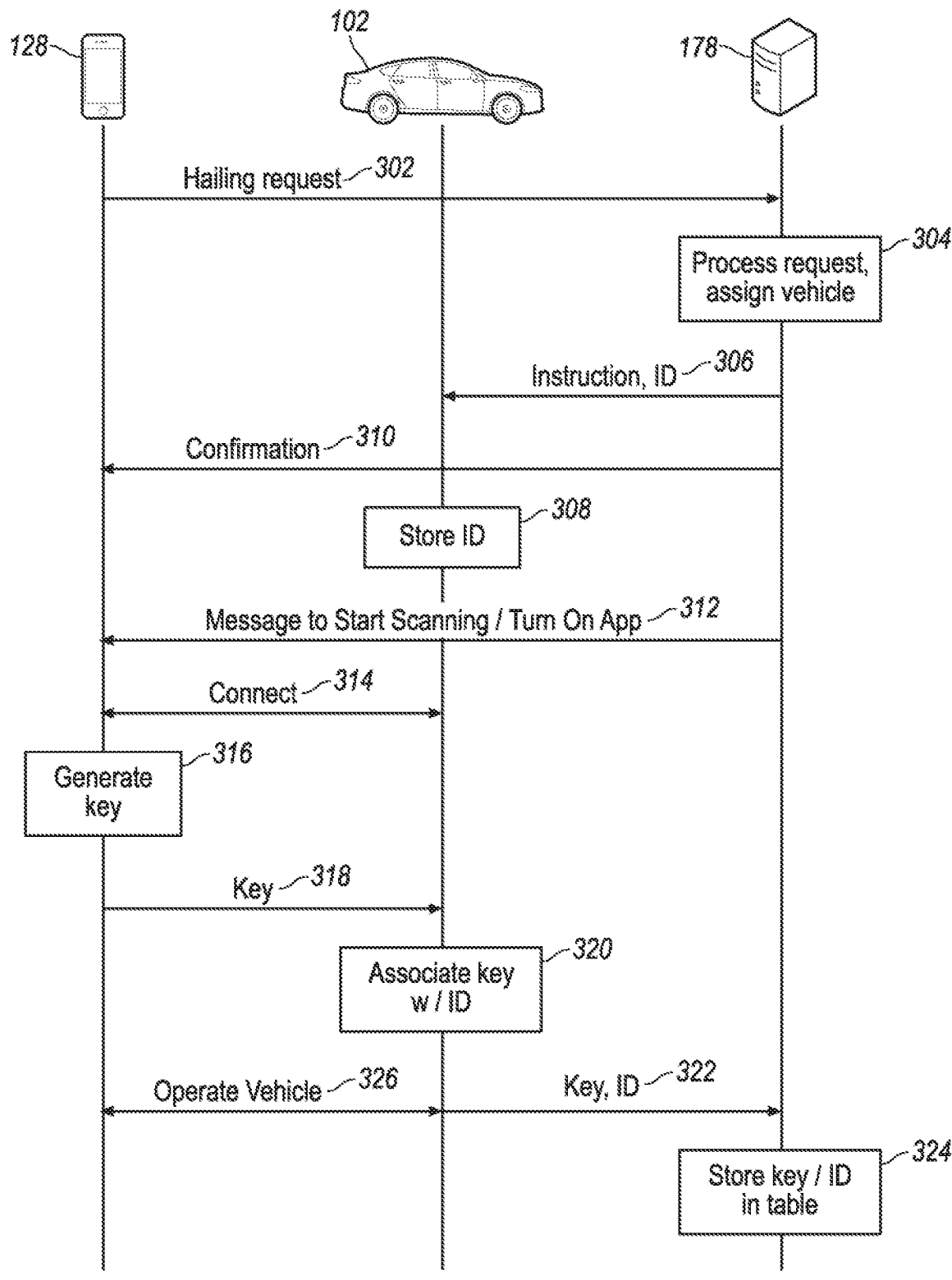
FIG. 3 illustrates an example data flow diagram for a first time connection of the vehicle system of one embodiment of the present disclosure.

Referring to FIG. 3, an example data flow diagram 300 for a first-time connection of the vehicle system of one embodiment of the present disclosure is illustrated. With continuing reference to FIGS. 1 and 2, at operation 302, the mobile device 128 sends a hailing request 302 to the server 178 to hail a ride for the user 202. The hailing request 302 may include a user ID 204, pick-up time and location, as well as other information regarding the ride (e.g. handicapped special request). Responsive to receiving the request, at operation 304, the server 178 processes the request and assigns a vehicle to the user 202. For instance, the vehicle 102 is assigned to the user 202 in the present example. The server 178 further verifies if the user ID 204 as received as a valid key stored in the lookup table database 208. Since it is the first time the user 202 hails a ride using the mobile device 128 in the present example, the verifying result would be no key associated. Alternatively, the verifying result may still indicate no key associated even if the user 202 used the hailing service before. These situations may include expired key, user un-subscription or the like.

At operation 306, server 178 sends hailing instructions to the vehicle 102. The hailing instructions may include a user identifier 204 (e.g. a user ID), pickup time and location, or the like to identify and pick up the user 202. The instruction may further include the verifying result indicative of whether the user ID 204 has a valid associated key 206 stored in the server 178. In response, at operation 308, the vehicle 102 stores the user ID 204 and performs operations based on the instruction as received to pick up the user 202. At operation 310, the server 178 sends a hailing confirmation to the mobile device 128 to confirm the hailing request has been successfully processed. At operation 312, the server 178 sends a message to the mobile device 128 instructing it to start the hailing application 160 or to start scanning/advertising for the vehicle 102. This operation may be performed at a predefined time (e.g. fifteen minutes) before the scheduled ride. Alternatively, the server 178 may continuously monitor the location of both the mobile device 128 and the vehicle 102, and sends the message out responsive to the distance between the mobile device 128 and the vehicle 102 being within a predefined distance (e.g. one hundred meters). Responsive to receiving the message, the mobile device opens the application 160 and starts to scan/advertise for the vehicle 102.

Responsive to detecting each other, the mobile device 128 and the vehicle 102 establish a wireless connection 130 at operation 314. The wireless connection 130 may be a BLE connection, Wi-Fi connection or any wireless connections supported by both the mobile device 128 and the vehicle 102. At operation 316, the mobile device 128 generates an encryption key 206 and sends the key to the vehicle 102 via the wireless connection 130 at operation 318. Responsive to receiving the encryption key 206, at operation 320, the vehicle 102 associates the encryption key 206 with the user identifier 204 previously received. At operation 322, the vehicle 102 sends the encryption key 206 and user identifier 204 as associated to the server 178 for storage. In response, at operation 324, the server 178 stores the encryption key 206 and user identifier 204 in a database lookup table 208 for future reference. At operation 326, the user 202 may operate the vehicle 102 using the key 206 as authenticated.

Figure 4:
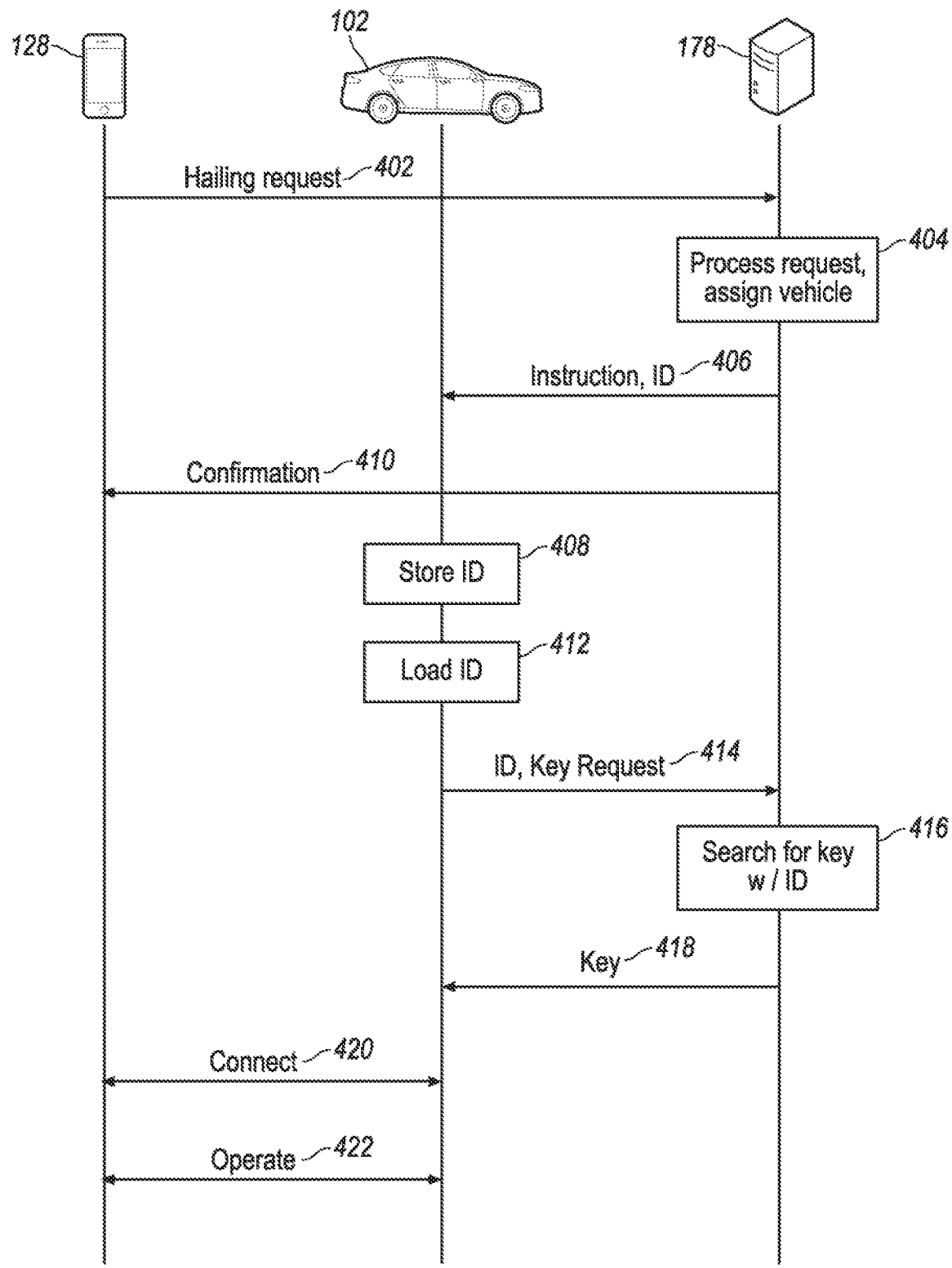
FIG. 4 illustrates an example data flow diagram for a following time connection of the vehicle system of one embodiment of the present disclosure.

Referring to FIG. 4, an example data flow diagram 400 for a following time connection of the vehicle system of one embodiment of the present disclosure is illustrated. With continuing reference to FIGS. 1 to 3, operations 402 to 410 are generally the same to operations 302 to 310 of FIG. 3. The only difference is, in the present example, a valid encryption key 206 has already been generated and stored in the server 178 as indicated in the instruction. At operation 412, responsive to trigger condition, the vehicle 102 loads the user identifier 204 and sends a key request with the identifier to the server 178. The trigger condition may include various conditions. For instance, the trigger condition may be a time trigger when the vehicle 102 determines a predefined time (e.g. fifteen minutes) before the scheduled ride has been reached. Alternatively, the trigger condition may be a location condition responsive to detecting the vehicle has arrived in a predefined geofence (e.g. near the pickup location). At operation 416, responsive to receiving the user identifier 204, the server 178 searches for a corresponding encryption key 206 from the lookup table 208, and sends the key 206 to the vehicle 102 for authentication at operation 418. At operation 420, the vehicle 102 connects to the mobile device 128. Since the vehicle 102 already has the encryption key 206, at operation 422, the user 202 may directly operate the vehicle 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a wireless transceiver; and
one or more controllers, programmed to
receive, via the wireless transceiver, a first hailing instruction that identifies a user to ride in the vehicle, the first hailing instruction including an identifier of a mobile device of the user, and a first verification result indicative of a lack of a valid key associated with the identifier stored by a server when the first hailing instruction is generated,
responsive to receiving a key from the mobile device via a wireless connection between the mobile device and the wireless transceiver, associate the key with the identifier,
send the key and the identifier as an associated pair to the server via the wireless transceiver,
receive a second hailing instruction subsequent to the first hailing instruction, the second hailing instruction including the identifier, and a second verification result indicative of the server stores the key and the identifier as the associated pair,
send a key request with the identifier to the server, and receive the key from the server.

2. The vehicle of claim 1, wherein the hailing instruction further includes a pickup location, and the one or more controllers are further programmed to:
operate the vehicle to the pickup location autonomously.

3. The vehicle of claim 1, wherein the hailing instruction further includes a pickup time, and the one or more controllers are further programmed to:
start to scan for the mobile device at a predefined time before the pickup time.

4. The vehicle of claim 1, wherein the hailing instruction further includes a pickup time, and the one or more controllers are further programmed to:
responsive to receiving, from the server, a message instructing to start to scan for the mobile device, then start to scan for the mobile device.

5. The vehicle of claim 1, wherein the wireless transceiver is programmed to support the following technologies: BLUETOOTH Low Energy (BLE), BLUETOOTH, ultra-wide band, Wi-Fi, near-field communication, radio-frequency identification or cellular.

6. The vehicle of claim 1, wherein the second hailing instruction further includes a second pickup time and a second pickup location.

7. A server, comprising:
one or more controllers, programmed to
responsive to receiving, from a mobile device, a first hailing request including an identifier, a pickup time, and a pickup location, select a first vehicle to respond to the first hailing request, verify a lookup database lacking a valid key corresponding to the identifier and generate a first verifying result,
send, to the mobile device, a first hailing confirmation identifying the first vehicle as being selected,
send, to the first vehicle as selected, the first verifying result and a hailing instruction including the identifier, the pickup time, and the pickup location, and
responsive to receiving, from the first vehicle, a key provided by the mobile device and associated with the identifier, store the key and the identifier associated as a pair in a lookup database,
responsive to receiving, from the mobile device, a second hailing request including the identifier, select a second vehicle to respond to the second hailing request and verify the lookup database storing the key and the identifier associated as the pair, and send the key to the second vehicle.

8. The server of claim 7, wherein the one or more controllers are further programmed to:
responsive to reaching a predefined time before the pickup time, send a message to the mobile device instructing to launch a hailing application.

9. The server of claim 7, wherein the one or more controllers are further programmed to:
monitor a first vehicle location received from the first vehicle and a mobile device location received from the mobile device,
responsive to detecting a distance between the first vehicle and the mobile device being within a predefined value calculated based on the first vehicle location and the mobile device location, send a message to the mobile device instructing to launch a hailing application.

10. The server of claim 7, wherein the hailing instruction further include autonomous driving instructions directing the vehicle to the pickup location.

11. A method for a vehicle, comprising:
responsive to receiving, from a server via a wireless network through a telematics control unit (TCU), a first hailing instruction including an identifier associated with a mobile device, a hardware identification address, and pickup location, autonomously operate the vehicle to the pickup location;
verifying a lack of a valid key associated with the identifier stored by the server;
responsive to identifying the mobile device using the hardware identification address, connect to the mobile device via a wireless connection through a wireless transceiver;
responsive to receiving a key from the mobile device via a wireless connection, associating the key with the identifier;
sending the key and identifier as an associated pair to the server via the TCU;
receiving, from the server, a second hailing instruction including the identifier, wherein the second hailing instruction is subsequent to the first hailing instruction;
responsive to a verification result indicative of the server storing the key and the identifier as the associated pair, sending a key request with the identifier to the server; and
receiving the key from the server.

12. The method of claim 11, wherein the hailing instruction further includes a pickup time, the method further comprising:
starting to scan for the mobile device at a predefined time before the pickup time.

13. The method of claim 11, wherein the hailing instruction further includes a pickup time, the method further comprising:
responsive to receiving, from the server, a message instructing to start to scan for the mobile device, then starting to scan for the mobile device.

14. The method of claim 11, wherein the wireless connection involves at least one of the following technologies: BLUETOOTH Low Energy (BLE), BLUETOOTH, ultra-wide band, Wi-Fi, near-field communication, or radio-frequency identification.

15. The vehicle of claim 1, wherein the one or more controllers are further programmed to:
subsequently receive a second hailing instruction including the identifier, and a second verification result indicative of the identifier corresponding to the key stored by the server;
responsive to a trigger condition, send a key request with the identifier to the server; and
receive the key from the server without communicating with the mobile device.

* * * * *